F. SWIFT & L. A. LYON.
Grain-Separator.
No. 215,690. Patented May 20, 1879.
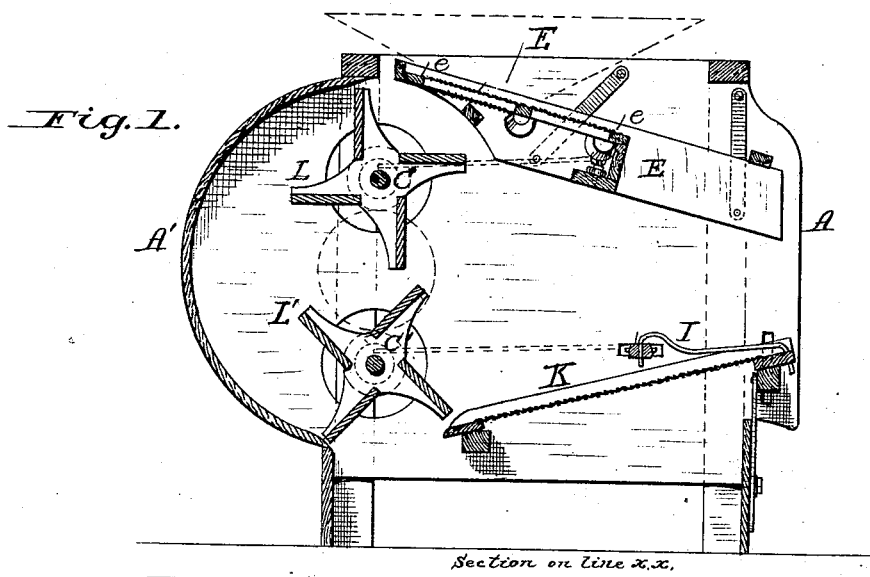
Fig. 1.
Section on line x.x.
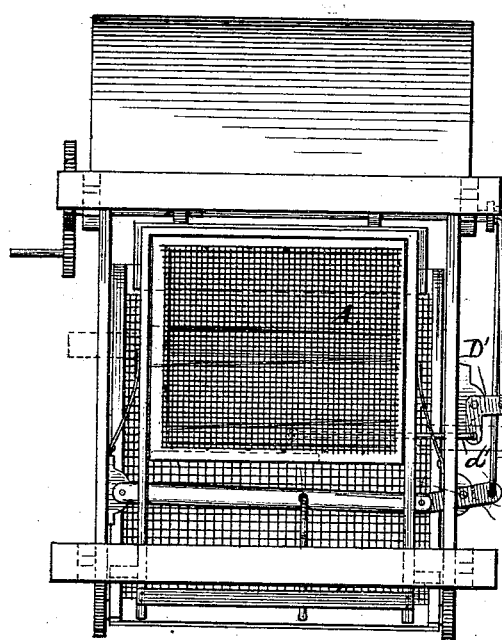
Fig. 2. Top View.
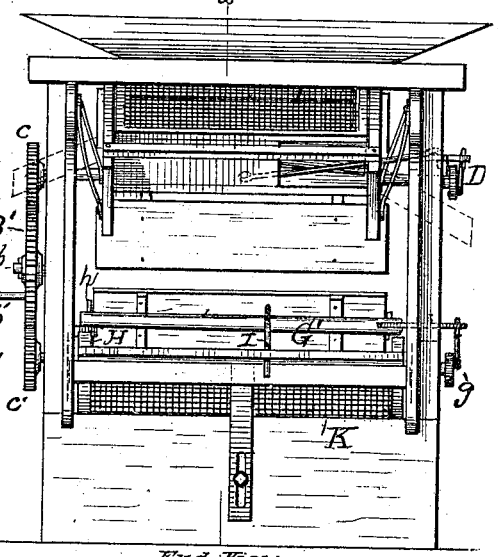
Fig. 3. End View.
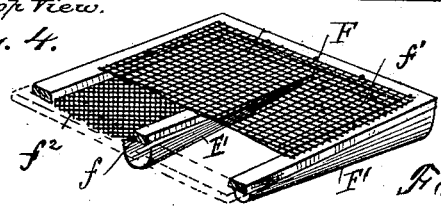
Fig. 4.
Attest:
H. D. Perrine
D. P. Cowl
Inventors.
Frank Swift
Lyman A. Lyon

UNITED STATES PATENT OFFICE.

FRANK SWIFT AND LYMAN A. LYON, OF HUDSON, MICHIGAN.

IMPROVEMENT IN GRAIN-SEPARATORS.

Specification forming part of Letters Patent No. 215,690, dated May 20, 1879; application filed April 21, 1879.

*To all whom it may concern:*

Be it known that we, FRANK SWIFT and LYMAN A. LYON, both of the town of Hudson, county of Lenawee, and State of Michigan, have invented certain new and useful Improvements in Grain-Separators, of which the following is a full, clear, and exact description, reference being had to the accompanying drawings, which form a part of this specification, and in which—

Figure 1 is a longitudinal vertical sectional view of our machine; Fig. 2, a plan view, Fig. 3, an end view, and Fig. 4 a detail view, of the seed-separator.

Our invention relates to a device for separating grain or seed; and the novelty consists in the construction and arrangement of parts, as will be more fully hereinafter set forth, and pointed out in the claim.

In carrying out our invention we employ the ordinary screen box or frame, having the ordinary fan-box, and furnishing journal-bearings for a shaft carrying a driving-gear wheel, as shown, with crank or other proper power-connections. This driving-wheel meshes with two pinions rigid upon shafts, also journaled in the frame, one above and one below the said driving-wheel.

Upon the opposite end of the upper shaft is formed or properly secured a crank, which, by a link, pitman, or the like, connects with an elbow-lever, which in turn is connected to a laterally-vibrating frame by a link, as shown. This laterally-vibrating frame is suspended by flexible spring-hooks or other proper hanging device, and it is provided with guides, in which is received a removable screen of peculiar and novel construction. This screen, when in position, occupies a proper incline to allow the grain, seed, and the like to gravitate toward the rear of the machine, the grain proper descending upon a lower screen, which will presently be described.

The upper screen is composed of an ordinary rectangular frame, a longitudinal central bar dividing the same, as shown. The upper half comprises a double screen, the one above being of coarser mesh than the one below, allowing the separation of the finer grass, clover, timothy seed, and the like, from the coarser seed, and of proper construction to shed the grain over the lower edge to the grain-screen below.

Upon the lower and central bars are secured open troughs, which, being inclined in opposite directions, and actuated by the vibratory motion of the frame, gravitate on opposite sides, and by means of proper apertures and connecting-spouts in the sides of the outer frames the seed of different kinds are separated and conveyed to proper receptacles upon opposite sides of the machine.

Upon the end of the lower shaft opposite to the driving-wheel is formed or secured a crank, which, by a proper link or pitman, is loosely connected to a centrally-pivoted lever, which, in turn, is loosely pivoted to a long lever, which is pivoted at the opposite end to a stud or lug rigidly secured to the opposite inner surface of the box.

From a point at or near the center of this last-mentioned lever a link connects with the lower frame, which, by means of the connections mentioned, has imparted to it a longitudinal vibratory motion—that is to say, the vibrations of the lower screen are on a plane at right angles to the vibrations of the upper or double screen. This lower or grain screen operates in proper guides of any ordinary or known construction.

The upper and lower shafts, which are actuated by the gear-connection with the driving-wheel, carry the fans, as shown; and these fans, rotating in the same direction, create a constant and steady current of air, which serves efficiently as a cleaning medium in connection with the screens.

Referring to the drawings, A represents the box, supported by proper legs, and having the ordinary semicircular fan-box A'. Journaled therein at $b$ is a shaft, B, carrying driving-wheel B', having crank $b'$ or other proper power-connections.

C represents the upper, and C' the lower, fan-shaft, each of which, by means of pinions $c\ c'$, are connected with the driving-gear B'. Upon the opposite end of the shaft C is a crank, D, which, by a link, $d$, is connected to a pivoted elbow-lever, D', and a link, $d'$, connects it with a laterally-vibrating frame, E, having guides $e$, which receive a double upper screen, F, as shown. This screen is removable, and has a central bar, $f$, an upper screen, $f^1$, of coarser mesh than the lower one, $f^2$, and the central bar, $f$, and lower rail of the frame are provided with open troughs F', inclined in opposite directions, as shown, for the purpose set forth.

From the shaft C' a crank, $g$, connects with a link, $g'$, to a centrally-pivoted lever, G, loosely pivoted in turn to a lever, G', pivoted at $h$ to a lug or stud, H, rigidly secured to the inner surface of the box A. A link, I, from the center of the lever G', connects with a lower longitudinally-vibrating grain-screen, K, as shown.

L represents the upper, and L' the lower, fan; and these fans, being actuated by the gearing described, afford a rotary motion to both fans in a similar direction, imparting a steady and constant current of air in the same direction.

From the foregoing description the operation, object, and advantages of the device are obvious.

We are aware that it is old to mount two fans, one above the other, in connection with sifting and grading mechanisms. We therefore do not claim such, broadly, as of our invention; but in those cases where two fans are used they have been placed in separate cases or compartments, and operate separately or successively.

Our fans are arranged within one and the same air-space, and co-operate to produce a single current. It is found in actual practice that this current comes more directly from the lower fan, L'. A portion of the current produced by the upper fan, L, is driven by it down the inner side of the case A', and is taken up by the blades of the fan L', (which blades are preferably set to strike past a given line alternately with the blades of fan L,) producing a current, it is found, more continuous and steady than that from a single fan. This uniformity is essential to the accurate and uniform separation of the lighter and heavier matters.

What we claim is—

The combination, with the fans L L', arranged to rotate within the same case or compartment and in the same direction, of the separating-shoe E and screen K, substantially as described.

In witness whereof we have hereto set our names this 15th day of April, A. D. 1879.

FRANK SWIFT.
LYMAN A. LYON.

In presence of—
THOMAS J. HILLER,
MRS. MILES STANDISH.